United States Patent
Shinoda et al.

(10) Patent No.: US 11,740,606 B2
(45) Date of Patent: Aug. 29, 2023

(54) SERVOMOTOR CONTROLLER

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 572 days.

(21) Appl. No.: 17/000,696

(22) Filed: Aug. 24, 2020

(65) Prior Publication Data

US 2021/0088998 A1    Mar. 25, 2021

(30) Foreign Application Priority Data

Sep. 24, 2019   (JP) ................................ 2019-172765

(51) Int. Cl.
   *G05B 19/404*   (2006.01)
   *G05B 19/416*   (2006.01)

(52) U.S. Cl.
   CPC ......... *G05B 19/404* (2013.01); *G05B 19/416* (2013.01); *G05B 2219/41145* (2013.01); *G05B 2219/41244* (2013.01)

(58) Field of Classification Search
   None
   See application file for complete search history.

(56) References Cited

U.S. PATENT DOCUMENTS

2018/0246491 A1*   8/2018   Shinoda ................. G05B 19/19

FOREIGN PATENT DOCUMENTS

| JP | 2003-149531 A | 5/2003 |
| JP | 2006-277495 A | 10/2006 |
| JP | 2012-045702 A | 3/2012 |
| JP | 2013-128387 A | 6/2013 |

* cited by examiner

*Primary Examiner* — Ryan A Jarrett
(74) *Attorney, Agent, or Firm* — Studebaker & Brackett PC

(57) ABSTRACT

The invention provides a servomotor controller that makes it possible to reduce compensation delay even when a dead band is provided. The servomotor controller includes a motion acquiring unit that acquires a motion of the servomotor, an acceleration amount acquiring unit that acquires an acceleration amount of the servomotor, a compensating unit that compensates a motion of the servomotor, and a compensation start determining unit that determines a start of the compensation by the compensating unit responsive to the motion of the servomotor, wherein the compensation start determining unit has a dead band unit that sets a dead band range which is a range of a predetermined value relative to the motion of the servomotor, and the dead band unit changes the dead band range based on the acceleration amount acquired by the acceleration amount acquiring unit.

4 Claims, 5 Drawing Sheets

SERVOMOTOR CONTROLLER

BACKGROUND OF THE INVENTION

This application is based on and claims the benefit of priority from Japanese Patent Application No. 2019-172765, filed on 24 Sep. 2019, the content of which is incorporated herein by reference.

FIELD OF THE INVENTION

The present invention relates to a servomotor controller.

RELATED ART

Conventionally, controllers for machine tools and the like perform control with a set dead band (see, e.g., Japanese Unexamined Patent. Application, Publication No. 2012-045702 and Patent Document 2: Japanese Unexamined Patent Application, Publication No. 2013-128387). Japanese Unexamined Patent Application, Publication No. 2012-045702 discloses: "As shown in FIG. 3, the dead band processing unit 250 sets the output value to 0 when the control compensation amount from the filter unit 242 is close to 0. The dead band processing unit 250 outputs the dead hand-processed control compensation amount to the limiter processing unit 260". In addition, Patent Document 2: Japanese Unexamined Patent Application, Publication No. 2013-128387 discloses that "The accommodation coefficient μm(n) is inversely proportional to the magnitudes of velocity and the coupling torque Tc, and a dead band can be provided so that the accommodation coefficient μm(n) is zero when the velocity is equal to or lower than a predetermined value".

Patent Document 1: Japanese Unexamined Patent Application, Publication No. 2012-045702
Patent Document 2: Japanese Unexamined Patent Application, Publication No. 2013-128387

SUMMARY OF THE INVENTION

It is desired that a dead band be provided for not performing compensation for static friction resistance of the servomotor, and that when compensation is to be performed, delay of the compensation can be reduced.

(1) An aspect of the present disclosure relates to a servomotor controller, the controller including a motion acquiring unit that acquires a motion of a servomotor, an acceleration amount acquiring unit that acquires an acceleration amount of the servomotor, a compensating unit that compensates the motion of the servomotor, and a compensation start determining unit that determines a start of a compensation by the compensating unit responsive to the motion of the servomotor, wherein the compensation start determining unit has a dead band unit that sets a dead band range which is a range of a predetermined value relative to the motion of the servomotor, and the dead band unit changes the dead band range based on the acceleration amount acquired by the acceleration amount acquiring unit.

According to an aspect of the present invention, compensation delay can be reduced even when a dead band is provided.

DETAILED DESCRIPTION OF THE INVENTION

Figure 1:
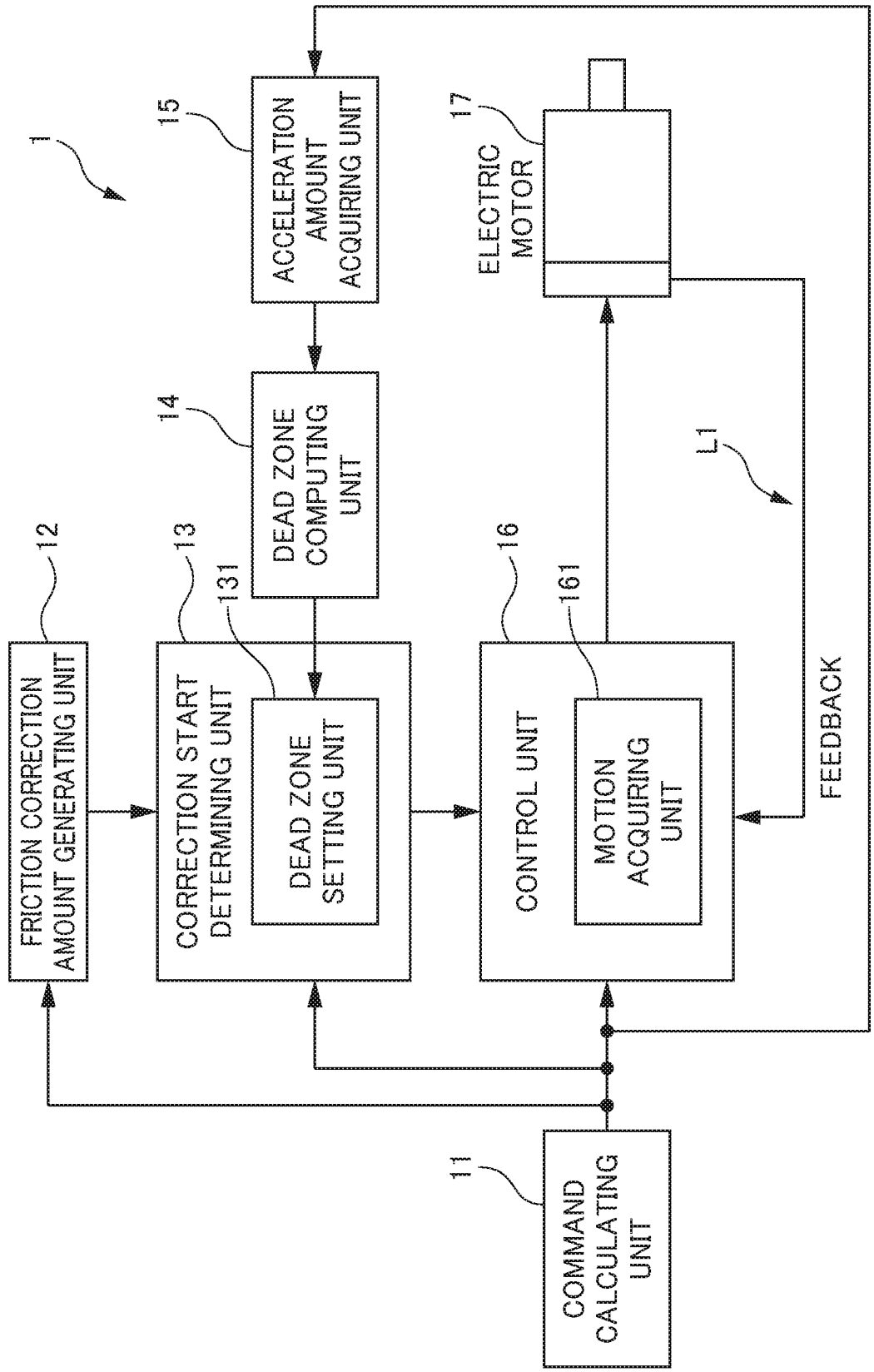
FIG. 1 is a drawing describing a configuration of a controller according to an embodiment of the present invention.

An embodiment of the present invention is described below. FIG. 1 is a drawing describing the configuration of a controller 1.

The servomotor controller 1 is a controller that enables static friction compensation when a servomotor 17 of a machine tool or the like starts to move (on startup) or rotates in reverse, and, as shown in FIG. 1, has a command calculating unit 11, a friction compensation amount generating unit 12, a compensation start determining unit 13, a dead band computing unit 14, an acceleration amount acquiring unit 15, a control unit 16, and an electric motor as a servomotor 17.

Based on an electrical signal from the control unit 16, the servomotor 17, for example, moves a table (not shown) in a horizontal direction via a nut (not shown), by rotating a ball screw (not shown) back and forth.

The command calculating unit 11 calculates a position command value for the servomotor 17. The friction compensation amount generating unit 12 as a compensating unit determines whether or not the servomotor 17 is stopped, using the position command value calculated by the command calculating unit 11. The friction compensation amount generating unit 12 also determines whether or not the servomotor has started to move from a stopped state, or whether or not it has rotated in reverse. Specifically, the friction compensation amount generating unit 12 detects startup and reverse rotation of the servomotor 17 based on the magnitude or change in sign of a velocity command calculated by the command calculating unit 11. In addition, the friction compensation amount generating unit 12 calculates a static friction compensation amount of the servomotor 17 and outputs it to the compensation start determining unit 13.

Figure 2:
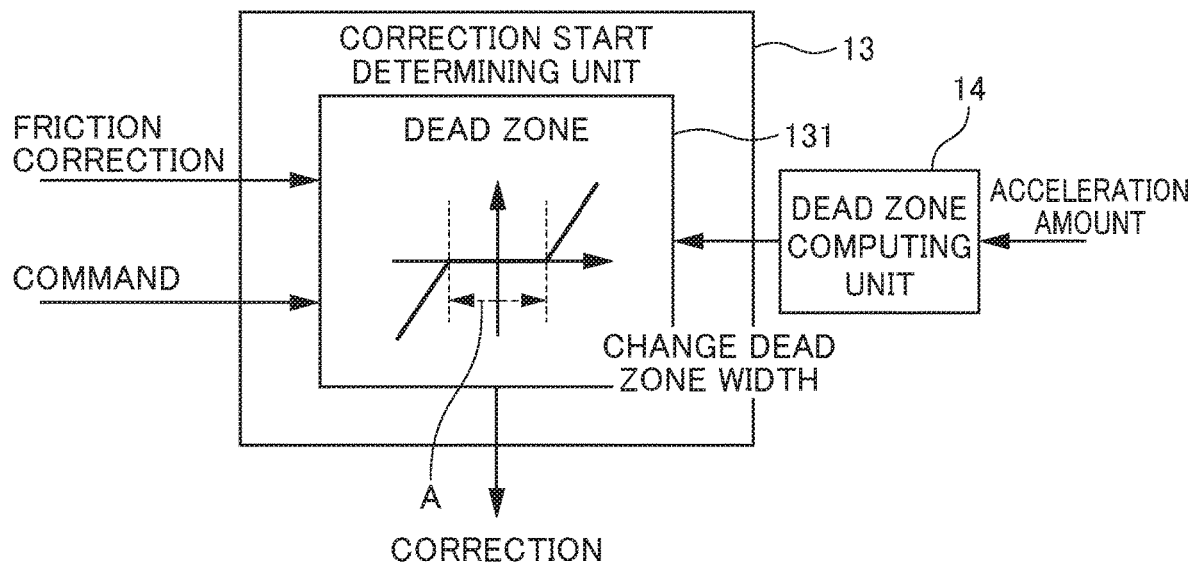
FIG. 2 is a drawing describing a configuration of a compensation start determining unit of a controller according to an embodiment of the present invention.

The compensation start determining unit 13 has a dead band unit that sets a dead band range which a range of a predetermined value relative to a motion of the servomotor 17. Specifically, the compensation start determining unit. 13 has a dead band setting unit 131 which constitutes the dead band unit, and the dead band setting unit 131 sets a dead band having a specific dead band range computed by the dead band computing unit 14, described below, at a stop position of the servomotor 17, as shown in FIG. 2. The compensation start determining unit 13 determines whether or not a motion amount of the servomotor 17 is within the dead band range. FIG. 2 is a drawing describing the configuration of the compensation start determining unit 13 of the controller 1.

Specifically, in a case where the servomotor 17 has started to move after stopping, for example, when the servomotor 17 has stopped after moving in a first direction and then moves from the stop position in the first direction again, the dead band range is set as "a range of 20 µm in the first direction from the stop position". Further, in a case where the servomotor 17 rotates in reverse, for example, when the servomotor has stopped after moving in a first direction and then starts to move from the stop position in the opposite direction of the first direction, the dead band range is set as "a range of 20 µm in the opposite direction from the stop position" as indicated by the arrows A in FIG. 8 and FIG. 9. As described below, this value of "20 µm" etc. is appropriately computed by the dead band computing unit 14 of the dead band unit, and is not a fixed, constant value.

When the motion amount of the servomotor 17 acquired by the motion acquiring unit. 161 is equal to or more than the dead band range, the compensation start determining unit 13 outputs a static friction compensation amount to the control unit 16 in order to start compensation with the friction compensation amount generated by the friction compensation amount generating unit 12. When the motion amount of the servomotor 17 is within the dead band range, the compensation start determining unit 13 performs control to not output the static friction compensation amount to the control unit 16 so as not to perform compensation by the static friction compensation amount generated by the friction compensation amount generating unit 12.

The control unit 16 is composed of a position control unit, a velocity control unit, and a current control unit. The position control unit receives a position error input from the command calculating unit 11, and outputs a corresponding velocity command to the velocity control unit. The velocity control unit receives the velocity command input from the position control unit, and outputs a corresponding current command to the current control unit. The current control unit receives the current command input from the velocity control unit, and amplifies a corresponding electric signal with an amplifier (not shown) and outputs the electric signal to the servomotor 17.

A control loop L1 is configured to perform feedback control of a position. (specifically, a rotational angle) of the servomotor 17 and a velocity (specifically, a rotational velocity) of the servomotor 17. The motion acquiring unit 161 of the control unit 16 acquires a motion (command motion amount) of the servomotor 17 by acquiring a position command value. In addition, the motion acquiring unit 161 acquires a motion (actual motion amount) of the servomotor 17 via the control loop L1. The acceleration amount acquiring unit 15 acquires an acceleration amount from a command acceleration obtained by differentiating the velocity command value. Based on the acceleration amount acquired by the acceleration amount acquiring unit 15, the dead band computing unit 14 constituting the dead band unit computes a dead band range suitable for the acceleration amount. In other words, the dead band computing unit 14 changes the dead band range to a suitable range based on the acceleration amount acquired by the acceleration amount acquiring unit 15.

Specifically, as described above, the dead band setting unit 131 sets a dead band having a dead band range computed by the dead band computing unit 14 at the stop position of the servomotor 17, as shown in FIG. 2. For example, the dead band range computed by the dead band computing unit 14 and set by the dead band setting unit 131 is the range indicated by the arrows A in the graph shown in FIG. 2, where the horizontal axis is a command and the vertical axis is a motion amount. This range is increased or decreased based on an acceleration amount acquired by the acceleration amount acquiring unit 15.

Figure 3:
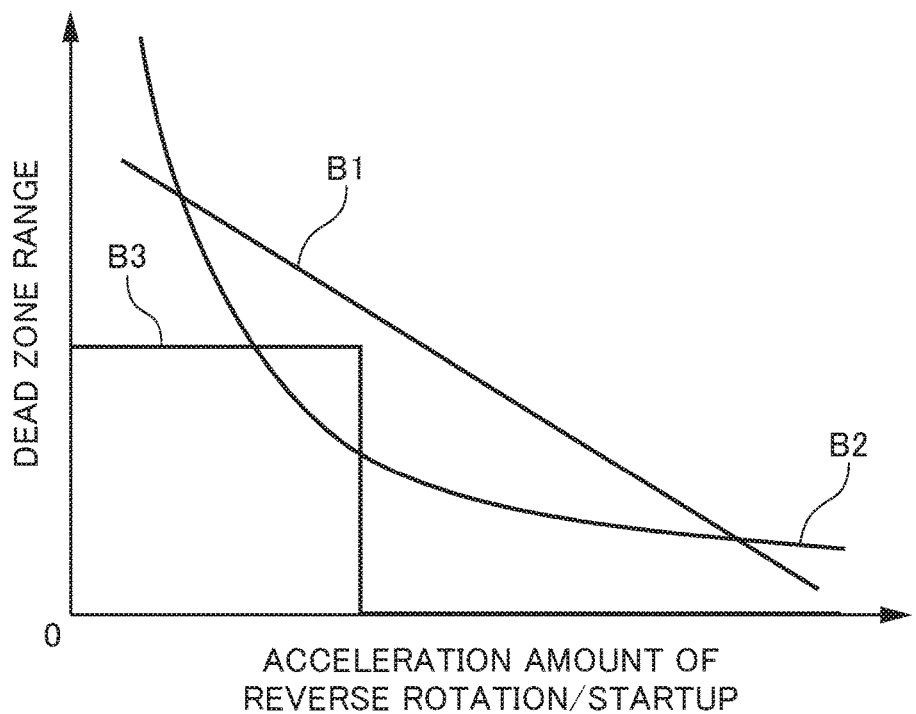
FIG. 3 is a graph showing the relationship between a dead band range set by a dead band setting unit of a controller according to an embodiment of the present invention and an acceleration amount.

The dead band range of a motion amount relative to a value of an acceleration amount is suitably determined based on the properties, etc. of a CAD/CAM that calculates the command. For example, a suitable graph is used as the graph of the value of the dead band range, such as a downward sloping straight line as indicated by the straight line B1 in FIG. 3, an inversely proportional curve as indicated by the curve B2 in FIG. 3, or a graph in which the dead band range is constant up to a predetermined value of the acceleration amount, and the value of the dead band range becomes 0 when the predetermined range is exceeded, as indicated by the polygonal line B3 in FIG. 3. FIG. 3 is a graph showing the relationship between the dead band range set by the dead band setting unit 131 of the controller 1 and the acceleration amount.

In each of these graphs, the dead band range becomes smaller as the acceleration amount increases. That is, the dead band setting unit 131 constituting the dead band unit sets the dead band range to be smaller the greater the acceleration amount.

The present embodiment as described above exhibits the following effects. In the present embodiment, the controller of the servomotor 17 includes a compensation start determining unit 13 that determines a start of a compensation by the friction compensation amount generating unit 12 as a compensating unit, responsive to a motion of the servomotor 17, the compensation start determining unit 13 has a dead band unit (dead band computing unit 14, dead band setting unit 131) that sets a dead band range which is a range of a predetermined value relative to the motion of the servomotor 17, and the dead band unit changes the dead band range based on an acceleration amount acquired by the acceleration amount acquiring unit 15.

Figure 8:
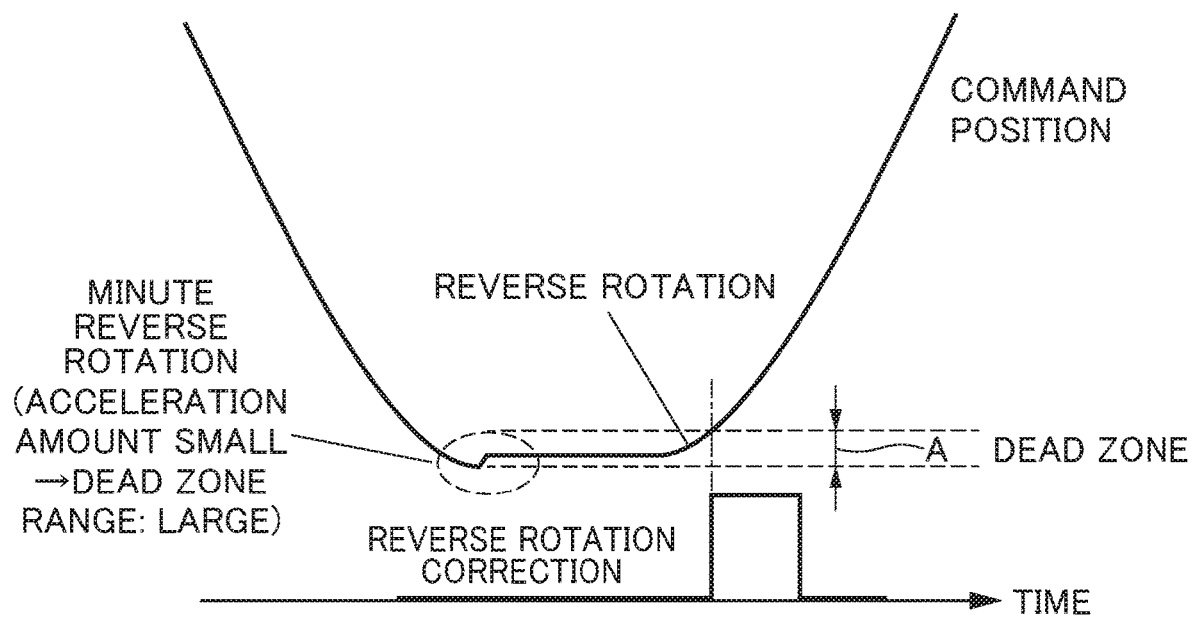
FIG. 8 is a graph showing a timing at which reverse rotation compensation is performed when a minute reverse rotation is within the dead band range.

Since it is thus possible to suitably change the dead band range based on the acceleration amount acquired by the acceleration amount acquiring unit 15, as shown in FIG. 8, for example, the dead band range (the width indicated by arrows A in FIG. 8) can be set to include minute reverse rotations (so-called "CAD junk") in the command. As a result, it is possible to avoid starting an excessive compensation for friction resistance of the servomotor 17 with respect to minute reverse rotations (i.e. to not perform the reverse rotation compensation C in FIG. 6).

Figure 4:
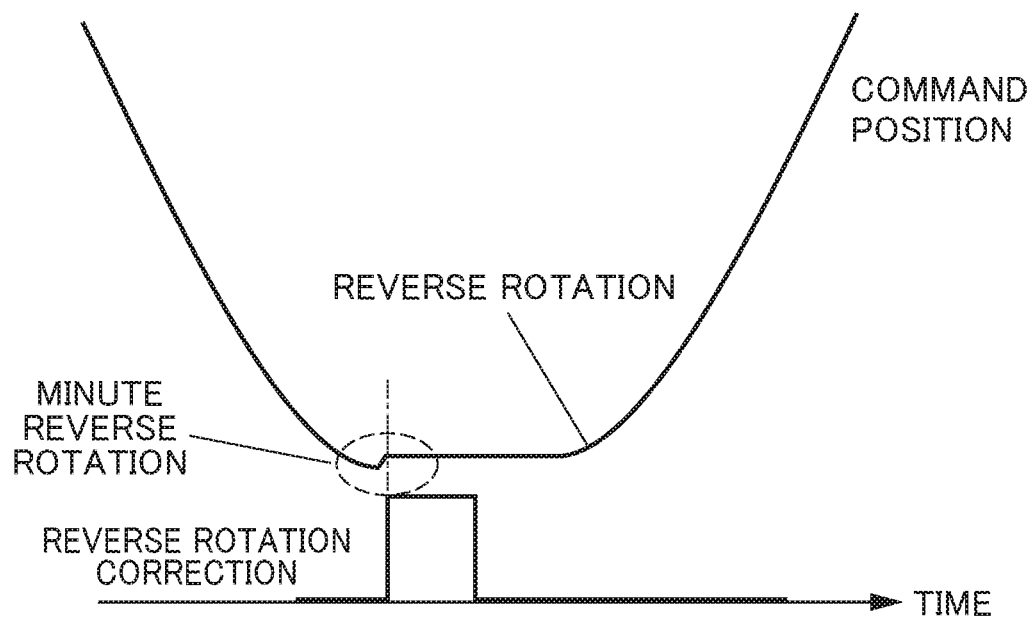
FIG. 4 is a graph showing a case in which there is no dead band, where a minute reverse rotation is within the dead band range and reverse rotation compensation is performed.

In a conventional configuration in which no dead band is provided, as shown in FIG. 4, when a minute reverse rotation in the command (so-called "CAD junk") was present, a compensation for the friction resistance of the servomotor 17 would be started with respect to the minute reverse rotation. However, since the present embodiment is provided with a dead band, it is possible to perform compensations of large reverse rotations as indicated by the solid lines in FIG. 6 and FIG. 8, while not performing compensations of minute reverse rotations in the command (so-called "CAD junk") as indicated by the dashed line in FIG. 6. This makes it possible to reduce the occurrence of scratches, etc. in a machined surface that is machined by a machine tool equipped with a servomotor 17.

Figure 6:
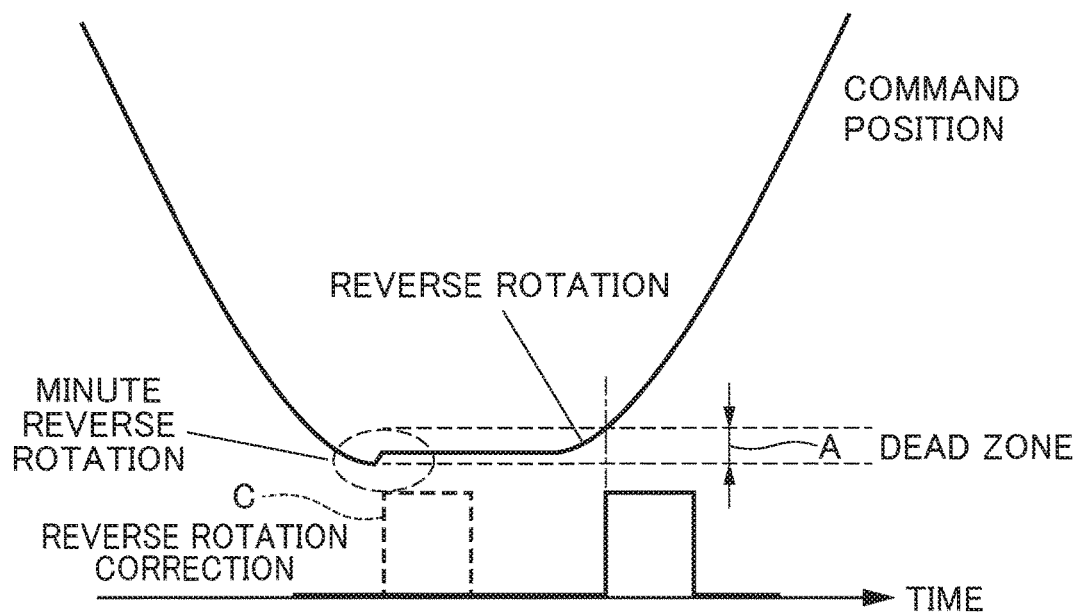
FIG. 6 is a graph showing a case in which reverse rotation compensation is not performed when a minute reverse rotation is within the dead band range.

FIG. 4 is a graph showing a case in which there is no dead band, where a minute reverse rotation is within the dead band range and reverse rotation compensation is performed. FIG. 6 is a graph showing a case in which reverse rotation compensation is not performed when a minute reverse rotation is within the dead band range. FIG. 8 is a graph showing a timing at which reverse rotation compensation is performed when a minute reverse rotation is within the dead band range.

Further, it is possible to set the dead band range (the width indicated by arrows A in FIG. 8 and FIG. 9) to be extremely small when the acceleration amount is large, which makes it possible to start the compensation immediately after the reverse rotation of the command. As a result, it is possible to reduce delay of the compensation (arrow D) due to a large dead band range (the width indicated by arrows A in FIG. 7) as shown in FIG. 7.

Figure 5:
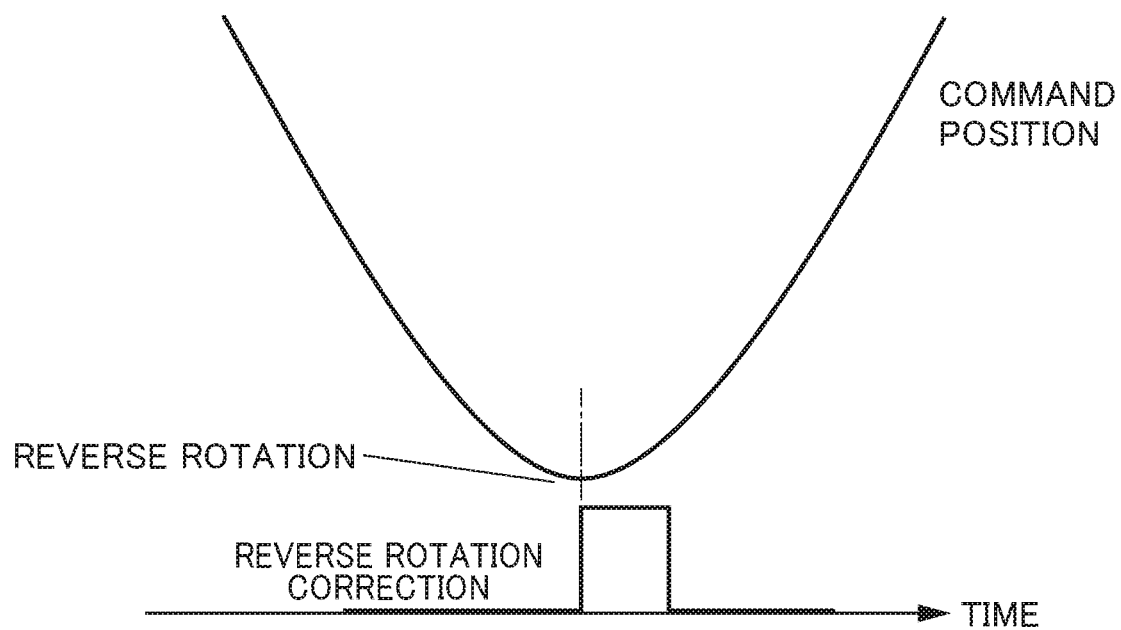
FIG. 5 is a graph showing a case in which there is no dead band, where the start of the reverse rotation compensation is not delayed.
Figure 7:
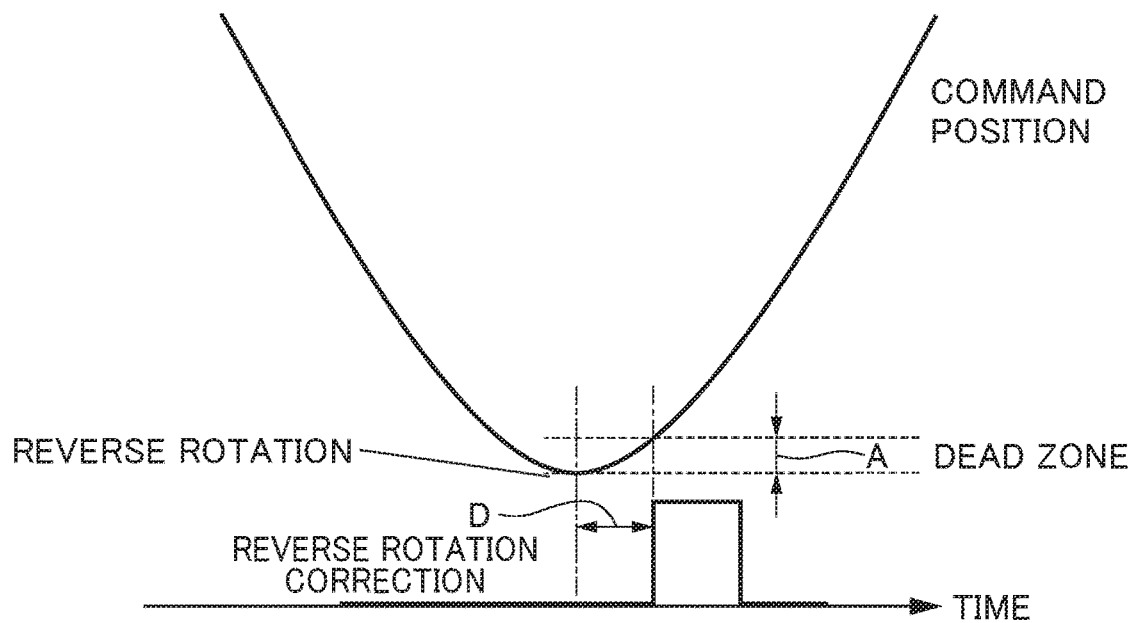
FIG. 7 is a graph showing a case in which the start of the reverse rotation compensation is delayed when there is a dead band.
Figure 9:
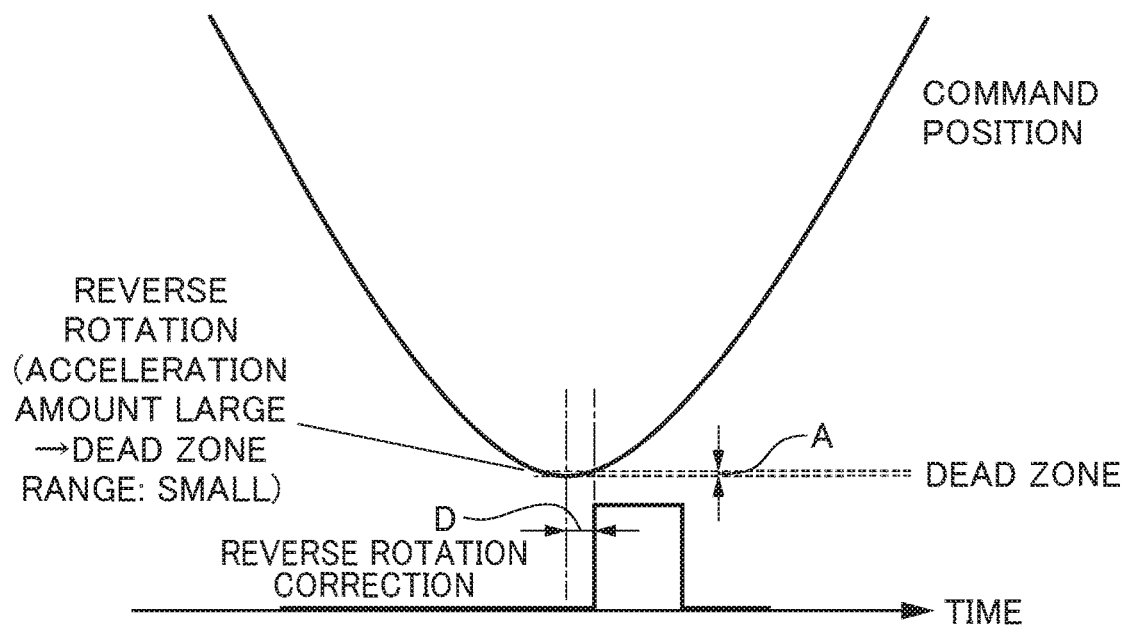
FIG. 9 is a graph showing the start of the reverse rotation compensation in a case in which there is a dead band and the dead band range is set to be small.

In a conventional configuration where no dead band is provided, it is possible to perform compensation of a reverse rotation without delay as shown in FIG. 5, but when a dead band is provided, the compensation start will be delayed as shown in FIG. 7. When the dead band range is especially large, the delay of the start of the compensation. (arrow D) is also great. However, in the present embodiment, the dead band range A can be set to be extremely small, as shown in FIG. 9, which therefore makes it possible to minimize the delay of the start of the compensation (arrow D).

FIG. 5 is a graph showing a case in which there is no dead band, where the start of the reverse rotation compensation is not delayed. FIG. 7 is a graph showing a case in which the start of the reverse rotation compensation is delayed when there is a dead band. FIG. 9 is a graph showing the start of the reverse rotation compensation in a case in which there is a dead band and the dead band range is set to be small.

Further, in the present embodiment, the acceleration amount is the command acceleration for the servomotor 17. This makes it possible to ascertain in advance whether any minute reverse rotations are present before and after the command before the servomotor 17 rotates in reverse, making it possible to set a suitable dead band range in advance.

Further, in the present embodiment, the motion acquiring unit 161 acquires the command motion amount of the servomotor 17, and the compensation start determining unit 13 starts the compensation when the motion amount of the servomotor 17 is equal to or more than the dead band range. This makes it possible to utilize the compensation at the time reverse rotation or startup based on a command motion amount begins, which allows for more precise compensation.

Further, in the present embodiment, the dead band setting unit 131 constituting the dead band unit sets the dead band range to be smaller the greater the acceleration amount. This makes it possible to reduce delay in starting the compensation in regions with a high acceleration amount, where there is a particular demand for the compensation to start without delay.

The present embodiment has been described above. While the embodiment described above is a preferred embodiment, the present invention is not limited only to this embodiment, but may be implemented in forms to which various changes are made. For example, the invention may be implemented in a changed form such as the variant described below.

In the present embodiment, when the motion amount of the servomotor 17 is outside the dead band range that is changed based on the acceleration amount based on the command acceleration, the compensation start determining unit 13 outputs a static friction compensation amount to the control unit 16 in order to start the compensation with the static friction compensation amount generated by the friction compensation amount generating unit 12, but the invention is not limited to this configuration. For example, at least one of an acceleration amount based on a command acceleration, an acceleration amount based on an actual acceleration of the servomotor 17, a torque command for the servomotor 17, and an actual torque of the servomotor 17 may be used as the acceleration amount.

Further, in the present embodiment, when the motion amount (command motion amount) of the servomotor 17 acquired by the motion acquiring unit 161 is equal to or more than the dead band range, the compensation start determining unit 13 starts the compensation with the static friction compensation amount generated by the static friction compensation amount generating unit 12, but the invention is not limited to this configuration. For example, the motion amount of the servomotor 17 acquired by the motion acquiring unit 161 and used by the compensation start determining unit 13 for the determination may be an actual motion amount.

The configurations of the motion acquiring unit, the acceleration amount acquiring unit, the compensating unit, the compensation start determining unit, and the dead band unit, are not limited to the configurations of the motion acquiring unit 161, the acceleration amount acquiring unit 15, the friction compensation amount generating unit. 12, the compensation start determining unit 13, the dead band setting unit 131, and the dead band computing unit 14.

EXPLANATION OF REFERENCE NUMERALS

1 Servomotor controller
11 Command calculating unit
12 Friction compensation amount generating unit. (compensating unit)
13 Compensation start determining unit
14 Dead band computing unit (dead band unit)
15 Acceleration amount acquiring unit
16 Control unit
17 Servomotor
131 Dead band setting unit (dead band unit)
161 Motion acquiring unit

What is claimed is:
1. A servomotor controller comprising:
a motion acquiring unit configured to acquire a motion of a servomotor;
an acceleration amount acquiring unit configured to acquire an acceleration amount of the servomotor;
a compensating unit configured to compensate the motion of the servomotor; and
a compensation start determining unit configured to determine a start of a compensation by the compensating unit responsive to the motion of the servomotor,
wherein the compensation start determining unit has a dead band unit configured to set a dead band range which is a range of a predetermined value relative to the motion of the servomotor, and
the dead band unit changes the dead band range based on the acceleration amount acquired by the acceleration amount acquiring unit.

2. The servomotor controller according to claim 1, wherein the acceleration amount is at least one of a command acceleration for the servomotor, an actual acceleration of the servomotor, a torque command for the servomotor, and an actual torque of the servomotor.

3. The servomotor controller according to claim 1, wherein the motion acquiring unit acquires a motion amount constituted by a command motion amount or an actual motion amount of the servomotor, and
    wherein the compensation start determining unit starts a compensation when the motion amount of the servomotor is equal to or more than the dead band range.

4. The servomotor controller according to claim 1, wherein the dead band unit sets the dead band range to be smaller the greater the acceleration amount.

* * * * *